(12) United States Patent
Ogawa

(10) Patent No.: US 8,715,530 B2
(45) Date of Patent: May 6, 2014

(54) FLUORESCENT PASTES AND FILMS

(75) Inventor: Kazufumi Ogawa, Awa (JP)

(73) Assignee: Empire Technology Development LLC, Wilmington, DE (US)

( * ) Notice: Subject to any disclaimer, the term of this patent is extended or adjusted under 35 U.S.C. 154(b) by 933 days.

(21) Appl. No.: 12/663,060

(22) PCT Filed: Jun. 5, 2008

(86) PCT No.: PCT/JP2008/060365
§ 371 (c)(1),
(2), (4) Date: Dec. 4, 2009

(87) PCT Pub. No.: WO2008/149931
PCT Pub. Date: Dec. 11, 2008

(65) Prior Publication Data
US 2010/0178473 A1     Jul. 15, 2010

(30) Foreign Application Priority Data
Jun. 6, 2007   (JP) .................... 2007-150768

(51) Int. Cl.
*C09K 11/02*   (2006.01)
(52) U.S. Cl.
USPC ................ 252/301.36; 428/403; 428/407
(58) Field of Classification Search
CPC .......... C09C 1/10; C09C 3/08; C09K 11/025; C09K 11/0811; H01J 1/62; H01J 29/20
USPC ................. 428/195.1, 403, 407; 252/301.35, 252/301.36
See application file for complete search history.

(56) References Cited

U.S. PATENT DOCUMENTS

| | | | | |
|---|---|---|---|---|
| 4,701,789 | A | * | 10/1987 | Bonye ............................ 348/816 |
| 2003/0099859 | A1 | | 5/2003 | Liu et al. |
| 2010/0183880 | A1 | | 7/2010 | Ogawa |
| 2011/0014416 | A1 | | 1/2011 | Ogawa |

FOREIGN PATENT DOCUMENTS

| | | | |
|---|---|---|---|
| JP | 08053666 | A  * | 2/1996 |
| JP | 2001-226669 | | 8/2001 |
| JP | 2003-168606 | | 6/2003 |
| JP | 2005-158634 | | 6/2005 |
| JP | 2006-008454 | | 1/2006 |
| JP | 2007-117827 | | 5/2007 |
| JP | 2007-118276 | | 5/2007 |
| JP | 2007-119545 | | 5/2007 |
| JP | 2007-126332 | | 5/2007 |

OTHER PUBLICATIONS

Machine translation of detailed description of JP 08-053666 acquired on Feb. 19, 2013.*

(Continued)

*Primary Examiner* — Gerard Higgins
(74) *Attorney, Agent, or Firm* — Workman Nydegger

(57) ABSTRACT

A fluorescent paste that can form a fluorescent film and can be manufactured without a binder resin and has a high recording density and peel resistance Fluorescent fine particles each coated with a film formed of a film compound having a reactive group and a curing agent having a plurality of crosslinking reaction groups each reacting with the reactive group to form bonds are blended with a solvent to manufacture fluorescent paste. The fluorescent paste is applied to a substrate coated with a film formed of a second film compound having a second reactive group and is cured by crosslinking reactions between the reactive group and the second reactive group, and the crosslinking reaction groups to form a fluorescent film.

12 Claims, 3 Drawing Sheets

(56) References Cited

OTHER PUBLICATIONS

International Search Report with Written Opinion for International Application No. PCT/JP2008/060365 mailed Sep. 16, 2008.
International Search Report and Written Opinion for International Patent Application No. PCT/JP2008/060397 mailed Aug. 26, 2008.
International Search Report with Written Opinion for International Application No. PCT/JP2008/060368 mailed Sep. 16, 2008.
U.S. Appl. No. 12/663,078, Apr. 27, 2012, Office Action.
U.S. Appl. No. 12/663,078, Sep. 11, 2012, Notice of Allowance.
U.S. Appl. No. 12/663,078, Dec. 24, 2012, Notice of Allowance.
U.S. Appl. No. 12/663,082, Mar. 6, 2013, Restriction Requirement.
U.S. Appl. No. 12/663,078, May 15, 2013, Issue Notification.
U.S. Appl. No. 12/663,082, Jul. 12, 2013, Office Action.

\* cited by examiner (A)

(B)

FLUORESCENT PASTES AND FILMS

BACKGROUND

Fluorescent paste has been widely used to manufacture fluorescent films for use in display apparatuses, such as cathode-ray tubes (CRTs) and plasma display panels (PDPs), illuminators, such as fluorescent lamps, X-ray intensifying screens, and luminous substances.

Conventional fluorescent paste contains fluorescent fine particles, a solvent, and a binder resin. Fluorescent paste is applied on a substrate to form a coating and is dried or subjected to additional heat treatment to decompose a binder resin and sinter fluorescent fine particles (see, for example, Patent Document 1) or cure the binder resin (see, for example, Patent Document 2), thus forming a fluorescent film.

[Patent Document 1] Japanese Unexamined Patent Application Publication No. 2001-226669.

[Patent Document 2] U.S. Patent Application Publication No. 2003/0099859.

However, as in a light-emitting diode described in Patent Document 2, the remaining binder resin in a fluorescent film reduces the content rate of a fluorescent substance in the fluorescent film, thus lowering the luminous efficiency.

Furthermore, as in a fluorescent film described in Patent Document 1, when the thermal decomposition of a binder resin and the sintering of fluorescent fine particles are performed after the formation of a coating, although the content rate of a fluorescent substance in the fluorescent film can be high, there are some problems, such as low manufacturing efficiency, poor adhesiveness of the fluorescent film to a substrate, and unavailability of plastics as substrates.

SUMMARY

Fluorescent paste can include a fluorescent fine particle and a curing agent. The fluorescent fine particles are coated with a film formed of a film compound having a reactive group at one end of a molecule of the film compound. The curing agent has a plurality of crosslinking reaction groups that react with the reactive group to form bonds.

In a fluorescent paste, the film compound may be covalently bound to the surface of the corresponding fluorescent fine particle via Si.

In a fluorescent paste the film formed of a film compound is a monomolecular film.

In a fluorescent paste, the reactive group may be a functional group containing an epoxy group, and the curing agent may be an imidazole compound.

In a fluorescent paste, the reactive group may be an amino or imino group, and the curing agent may be a compound having at least two isocyanate groups.

The fluorescent paste may further include a photo-curing agent that initiates the polymerization of the reactive groups induced by photoirradiation, wherein the reactive groups are polymerizable.

In this case, the photo-curing agent may be a cationic photo-curing agent.

A method for manufacturing fluorescent paste can include the steps of: A) bringing a film compound having a reactive group and a surface bonding group at opposite ends of a molecule of the film compound into contact with fluorescent fine particles to form a bond between the surface bonding group and the surface of the corresponding fluorescent fine particle, thus manufacturing reactive fluorescent fine particles each coated with a film formed of the film compound; and B) blending the reactive fluorescent fine particles, a curing agent having a plurality of crosslinking reaction groups that react with the reactive group to form bonds, and a solvent.

In a method for manufacturing fluorescent paste, the unreacted film compound can be washed away in the step A, and the film formed of the film compound on the surface of the reactive fluorescent fine particles is a monomolecular film.

In a method for manufacturing fluorescent paste, the surface bonding group may be an alkoxysilyl group, and step A may be preformed in the presence of at least one compound selected from the group consisting of carboxylic acid metal salts, carboxylate ester metal salts, carboxylic acid metal salt polymers, carboxylic acid metal salt chelates, titanate esters, and titanate ester chelates.

In a method for manufacturing fluorescent paste, the surface bonding group may be an alkoxysilyl group, and step A may be performed in the presence of at least one compound selected from the group consisting of ketimine compounds, organic acids, aldimine compounds, enamine compounds, oxazolidine compounds, and aminoalkylalkoxysilane compounds.

In a fluorescent film, a mixture containing fluorescent fine particles and a curing agent is applied on a substrate, each of the fine particles being coated with a film formed of a film compound having a reactive group, the curing agent having a plurality of crosslinking reaction groups each reacting with the reactive group to form bonds, the substrate being coated with a film formed of a second film compound having a second reactive group that reacts with the crosslinking reaction groups to form a bond, and the mixture is cured by crosslinking reactions between the reactive group and the second reactive group, and the crosslinking reaction groups.

In a fluorescent film, the reactive group and the second reactive group may be functional groups containing an epoxy group, and the curing agent may be an imidazole compound.

In a fluorescent film, the reactive group and the second reactive group may be amino or imino groups, and the curing agent may be a compound having at least two isocyanate groups.

A method for manufacturing a fluorescent film can include the steps of: A) bringing a film compound having a reactive group and a surface bonding group at opposite ends of a molecule of the film compound into contact with fluorescent fine particles to form a bond between the surface bonding group and the surface of the corresponding fluorescent fine particle, thus manufacturing reactive fluorescent fine particles each coated with a film formed of the film compound; B) blending the reactive fluorescent fine particles, a curing agent having a plurality of crosslinking reaction groups that react with the reactive group to form bonds by heating, and a solvent, thereby manufacturing fluorescent paste, C) bringing a second film compound having a second reactive group that reacts with the crosslinking reaction groups to form a bond and a second surface bonding group at opposite ends of a molecule of the second film compound into contact with a substrate to form a bond between the second surface bonding group and the substrate, thus manufacturing a reactive substrate coated with the second film compound; D) forming a coating of the fluorescent paste on the reactive substrate; and E) heating the coating to form covalent bonds by a reaction between the reactive group and the crosslinking reaction groups and a reaction between the second reactive group and the crosslinking reaction groups, thereby curing the coating.

In a method for manufacturing a fluorescent film, the reactive group and the second reactive group may be polymerizable. In step B, a photo-curing agent that initiates polymerization between the reactive group and the second reactive group, which polymerization is induced by photoirradiation, may be further blended into the fluorescent paste.

In step E, only a pattern portion of the surface of the coating may be selectively exposed to cause a polymerization reaction of the reactive group and the second reactive group in the pattern portion, thereby forming a partially cured film that is cured only in the pattern portion by polymerization of the reactive group and the second reactive group. The coating on a portion other than the patterned portion may be washed away. Then the partially cured film may be heated to form covalent bonds by a reaction between the reactive group and the crosslinking reaction group and a reaction between the second reactive group and the crosslinking reaction group, thereby curing the partially cured film to manufacture a fluorescent film formed in a pattern.

In a method for manufacturing a fluorescent film, the surface bonding group and the second surface bonding group may be alkoxysilyl groups, and steps A and C may be performed in the presence of at least one compound selected from the group consisting of carboxylic acid metal salts, carboxylate ester metal salts, carboxylic acid metal salt polymers, carboxylic acid metal salt chelates, titanate esters, and titanate ester chelates.

In a method for manufacturing a fluorescent film, the surface bonding group and the second surface bonding group may be alkoxysilyl groups, and the steps A and C may be performed in the presence of at least one compound selected from the group consisting of ketimine compounds, organic acids, aldimine compounds, enamine compounds, oxazolidine compounds, and aminoalkylalkoxysilane compounds.

DESCRIPTION OF DRAWINGS

FIG. 2(A) illustrates the cross-sectional structure of a cadmium sulfide fine particle before a reaction, and FIG. 2(B) illustrates the cross-sectional structure of the cadmium sulfide fine particle on which a monomolecular film of a film compound having an epoxy group has been formed.

DETAILED DESCRIPTION

Figure 1:
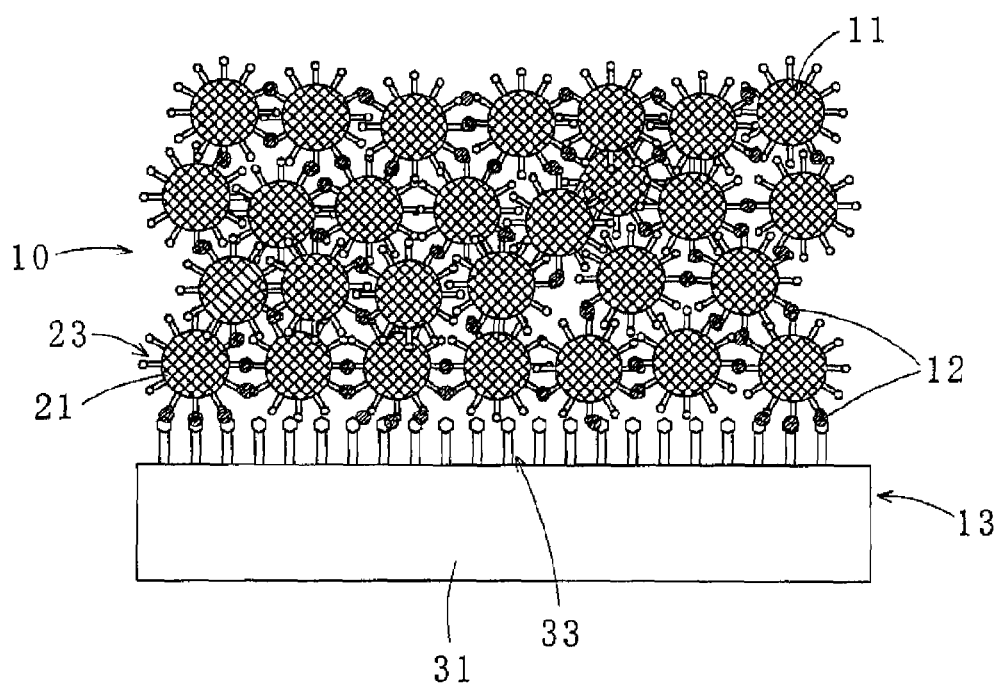
FIG. 1 is a schematic explanatory view of the cross-sectional structure of a fluorescent film.

The fluorescent paste, a method for manufacturing the fluorescent paste, a fluorescent film including the fluorescent paste, and a method for manufacturing the fluorescent film are now described. The fluorescent paste is prepared from a mixture that contains reactive fluorescent fine particles, in which fluorescent fine particles have reactive groups on the surface thereof, and a curing agent, which are prepared by a method for manufacturing the fluorescent paste. A fluorescent film can be formed by curing a coating containing the fluorescent fine particles by a crosslinking reaction between the reactive groups and the curing agent by a method for manufacturing the fluorescent film.

The fluorescent paste does not need a binder resin, does not need to be sintered, and can form a fluorescent film that adheres strongly to a substrate.

In a fluorescent paste and methods for manufacturing fluorescent paste, each of the fluorescent fine particles in the fluorescent paste is coated with a film formed of a film compound, and reactive groups on the surface of the film react with crosslinking reaction groups of the curing agent in the fluorescent paste. Thus, the fluorescent paste does not need a binder resin and does not need to be sintered at a high temperature in manufacturing a fluorescent film.

In a fluorescent paste, since a molecule of the film compound is covalently bound to the surface of the corresponding fluorescent fine particle via Si, a film formed of the film compound can be firmly fixed on the surface of the fluorescent fine particle.

In a fluorescent paste and method for manufacturing fluorescent paste, since the film formed of a film compound is a monomolecular film, a component corresponding to a binder can be minimized, and the fluorescence properties can be improved.

In a fluorescent paste, since a crosslinking reaction between the reactive group containing an epoxy group and the imidazole curing agent forms an N—$CH_2CH(OH)$ bond, a strong bond can be formed by heating.

In a fluorescent paste, since a crosslinking reaction between the reactive group of an amino or imino group and the isocyanate group forms an NH—CONH bond, a strong bond can be formed by heating.

In a fluorescent paste, since the reactive group is polymerizable, and the paste further includes a photo-curing agent that initiates the polymerization of the polymerizable reactive group induced by photoirradiation, the fluorescent paste can form a fluorescent film by photoirradiation.

In a fluorescent paste, since the photo-curing agent is a cationic photo-curing agent, a cationically polymerizable epoxy group can be used as the reactive group.

In a method for manufacturing fluorescent paste, since the step A can be performed in the presence of at least one compound selected from the group consisting of carboxylic acid metal salts, carboxylate ester metal salts, carboxylic acid metal salt polymers, carboxylic acid metal salt chelates, titanate esters, and titanate ester chelates, which catalyzes a condensation reaction between an alkoxysilyl group and a hydroxyl group, the time required to perform the step A can be reduced, and a fluorescent film can be manufactured more efficiently.

In methods for manufacturing a fluorescent paste, since the step A can be performed in the presence of at least one compound selected from the group consisting of ketimine compounds, organic acids, aldimine compounds, enamine compounds, oxazolidine compounds, and aminoalkylalkoxysilane compounds, which catalyzes a condensation reaction between an alkoxysilyl group and a hydroxyl group, the time required to perform the step A can be reduced, and a fluorescent film can be manufactured more efficiently.

In the presence of these compounds and the above-mentioned at least one compound selected from the group consisting of carboxylic acid metal salts, carboxylate ester metal salts, carboxylic acid metal salt polymers, carboxylic acid metal salt chelates, titanate esters, and titanate ester chelates, since these compounds act as promoters, the time required to perform the step A can be further reduced.

In fluorescent films and methods for manufacturing a fluorescent film, a mixture containing fluorescent fine particles each coated with a film formed of a film compound having a reactive group and a curing agent having a plurality of crosslinking reaction groups that react with the reactive group to form bonds is applied on a reactive substrate coated with a film formed of a second film compound having a second reactive group, and a coating of fluorescent paste is cured by crosslinking reactions between the reactive group and the second reactive group, and the crosslinking reaction group. The substrate and the fluorescent film are therefore combined in one piece. Thus, a fluorescent film that has high peel resistance and fluorescent substance density and that can be manufactured by a convenient method, and a method for manufacturing the fluorescent film can be provided.
[

In a fluorescent film, since a crosslinking reaction between the reactive group containing an epoxy group and the second reactive group, and the imidazole compound form an N—CH$_2$CH(OH) bond, a strong bond can be formed by heating.

In a fluorescent film, since an NH—CONH bond is formed by a crosslinking reaction between the reactive group of an amino or imino group and the second reactive group, and the isocyanate group, a strong bond can be formed by heating.

In a method for manufacturing a fluorescent film, the reactive group and the second reactive group are polymerizable, a photo-curing agent is further blended into the fluorescent paste, and only a pattern portion on the surface of the coating is selectively exposed to cause a polymerization reaction in the pattern portion, thereby forming a partially cured film. Thus, a fluorescent film formed in a pattern can be manufactured without complicated procedures, such as pretreatment of the surface of a substrate and removal of a portion of a fluorescent film other than a pattern portion by laser ablation.

In a method for manufacturing a fluorescent film, since the steps A and C are performed in the presence of at least one compound selected from the group consisting of carboxylic acid metal salts, carboxylate ester metal salts, carboxylic acid metal salt polymers, carboxylic acid metal salt chelates, titanate esters, and titanate ester chelates, which catalyzes a condensation reaction between an alkoxysilyl group and a hydroxyl group, the time required to perform the steps A and C can be reduced, and a fluorescent film can be manufactured more efficiently.

In methods for manufacturing a fluorescent film, since the steps A and C are performed in the presence of at least one compound selected from the group consisting of ketimine compounds, organic acids, aldimine compounds, enamine compounds, oxazolidine compounds, and aminoalkylalkoxysilane compounds, which catalyzes a condensation reaction between an alkoxysilyl group and a hydroxyl group, the time required to perform the steps A and C can be reduced, and a fluorescent film can be manufactured more efficiently.

In the presence of both of these compounds and the above-mentioned at least one compound selected from the group consisting of carboxylic acid metal salts, carboxylate ester metal salts, carboxylic acid metal salt polymers, carboxylic acid metal salt chelates, titanate esters, and titanate ester chelates, since these compounds act as promoters, the time required to perform the steps A and C can be further reduced.

Cadmium sulfide paste serving as an example of fluorescent paste and a cadmium sulfide cured film 10 serving as an example of a fluorescent film are described below with reference to the drawings.

Cadmium sulfide paste contains epoxidized cadmium sulfide fine particles (an example of reactive fluorescent fine particles) 11, which are cadmium sulfide fine particles (an example of fluorescent fine particles) 21 each coated with a monomolecular film 23, which is an example of a film formed of a film compound having an epoxy group (an example of a reactive group), and 2-methylimidazole 12, which is an example of a curing agent having an imino group and an amino group (examples of crosslinking reaction groups), which react with an epoxy group to form a bond.

As illustrated in FIG. 1, cadmium sulfide paste composed of a mixture containing epoxidized cadmium sulfide fine particles 11, which are cadmium sulfide fine particles 21 each coated with a monomolecular film 23 of a film compound having an epoxy group, and 2-methylimidazole 12, which is an example of a curing agent having an imino group and an amino group that react with an epoxy group to form a bond, is applied on an epoxidized glass substrate (an example of a reactive substrate) 13, which is a glass substrate (an example of a substrate) 31 coated with a monomolecular film 33 of a second film compound having an epoxy group (an example of a second reactive group), and the resulting coating 14 of the cadmium sulfide paste (see FIG. 3) is cured by a crosslinking reaction between the epoxy group and crosslinking reaction groups to form a cadmium sulfide cured film 10.

Figure 2A:
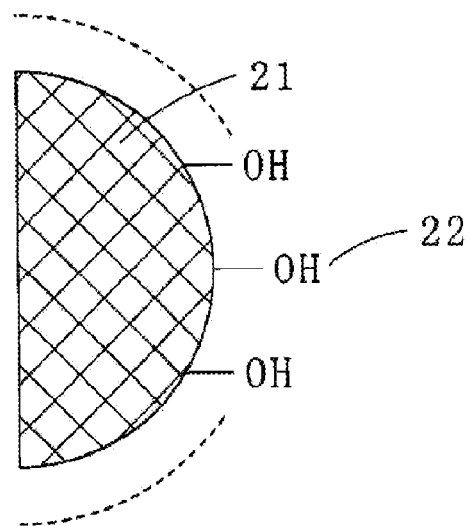
FIGS. 2(A) and 2(B) are schematic views that illustrate the step of manufacturing epoxidized cadmium sulfide fine particles in a method for manufacturing the fluorescent film.
Figure 2B:
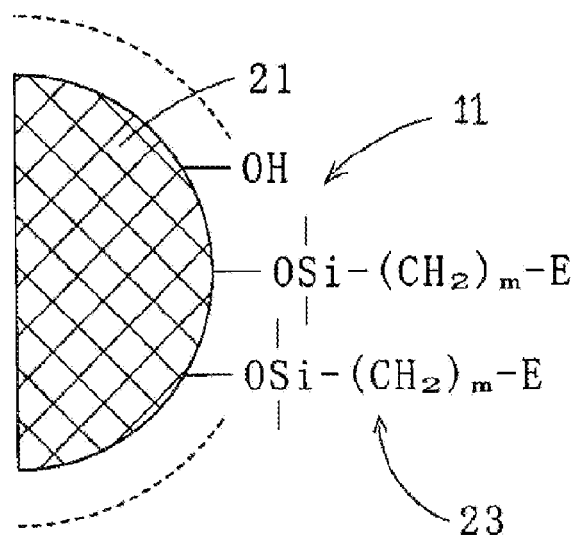

As illustrated in FIGS. 2(A) and 2(B), a method for manufacturing cadmium sulfide paste includes A) bringing a film compound having an epoxy group into contact with cadmium sulfide fine particles 21 to produce epoxidized cadmium sulfide fine particles 11, and B) blending the epoxidized cadmium sulfide fine particles 11, 2-methylimidazole 12 (FIG. 1), and a solvent to produce cadmium sulfide paste.

Figure 3:
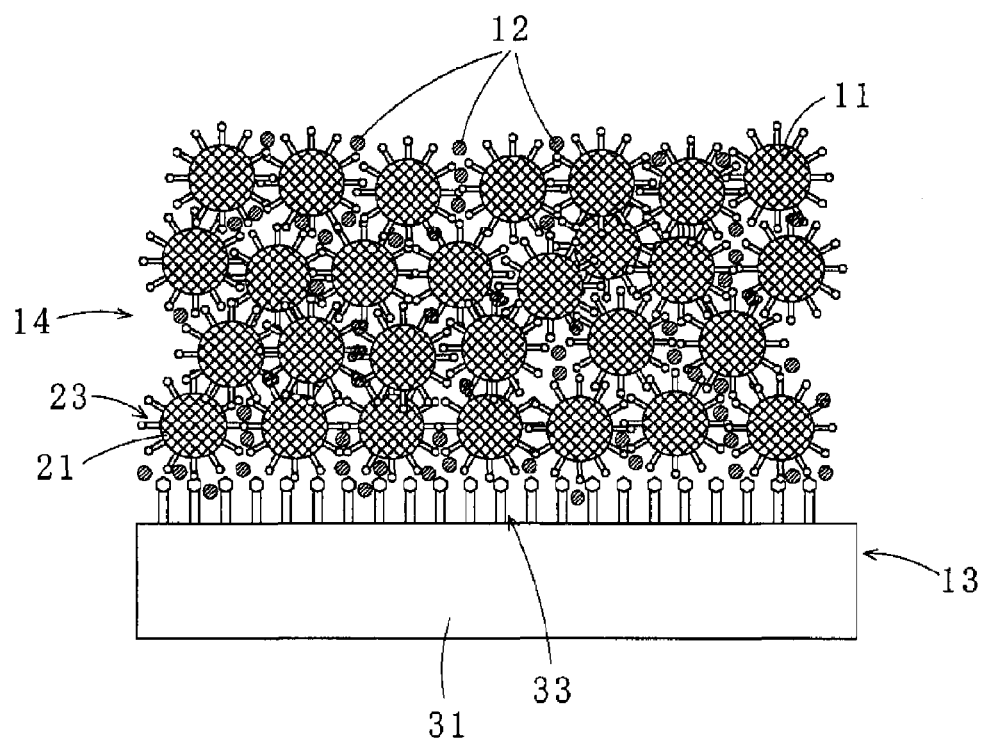
FIG. 3 is a schematic view that illustrates the step of forming a coating of cadmium sulfide paste in a method for manufacturing the fluorescent film according to the second embodiment of the present invention.

A method for manufacturing a cadmium sulfide cured film 10 includes, in addition to the steps A and B, C) bringing a second film compound having an epoxy group into contact with a glass substrate 31 to produce an epoxidized glass substrate 13, D) applying the cadmium sulfide paste produced in the step B on the surface of the epoxidized glass substrate 13 to produce a coating 14, as illustrated in FIG. 3, and E) curing the coating 14 by a crosslinking reaction between the epoxy group and crosslinking reaction group to produce the cadmium sulfide cured film 10 (FIG. 1).

The steps A to E will be described in detail below.

In the step A, a film compound having an epoxy group is brought into contact with cadmium sulfide fine particles 21 to produce epoxidized cadmium sulfide fine particles 11 coated with a monomolecular film 23 of a film compound having an epoxy group (FIG. 2).

The particle diameter of the cadmium sulfide fine particles 21 is not limited and can range from 10 nm to 1 μm. When the cadmium sulfide fine particles 21 have a particle diameter below 10 nm, the molecular size of the film compound is not as negligible. When the cadmium sulfide fine particles 21 have a particle diameter above 1 μm, the diameter of the cadmium sulfide fine particles 21 is excessively large relative to the thickness of the cadmium sulfide cured film 10. This results in an increase in void ratio and reduces the fluorescence yield.

The film compound having an epoxy group may be any compound that can be adsorbed on or bound to the surface of the cadmium sulfide fine particles 21 to form a monomolecular film by self-organization. The film compound having an epoxy group is a straight-chain alkylene group having a functional group containing an epoxy group (oxirane ring) at one end and an alkoxysilyl group (an example of a surface bonding group) at the other end, that is, an alkoxysilane compound having the following general formula (Chemical formula 1):

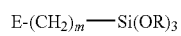
[Chemical formula 1]

wherein E can be a functional group having an epoxy group, m can be an integer of 3 to 20, and R can be an alkyl group having 1 to 4 carbon atoms.

Specific examples of the film compound having an epoxy group include the following alkoxysilane compounds (1) to (12).

(1) $(CH_2OCH)CH_2O(CH_2)_3Si(OCH_3)_3$
(2) $(CH_2OCH)CH_2O(CH_2)_7Si(OCH_3)_3$
(3) $(CH_2OCH)CH_2O(CH_2)_{11}Si(OCH_3)_3$
(4) $(CH_2CHOCH(CH_2)_2)CH(CH_2)_2Si(OCH_3)_3$
(5) $(CH_2CHOCH(CH_2)_2)CH(CH_2)_4Si(OCH_3)_3$
(6) $(CH_2CHOCH(CH_2)_2)CH(CH_2)_6Si(OCH_3)_3$
(7) $(CH_2OCH)CH_2O(CH_2)_3Si(OC_2H_5)_3$
(8) $(CH_2OCH)CH_2O(CH_2)_7Si(OC_2H_5)_3$
(9) $(CH_2OCH)CH_2O(CH_2)_{11}Si(OC_2H_5)_3$
(10) $(CH_2CHOCH(CH_2)_2)CH(CH_2)_2Si(OC_2H_5)_3$
(11) $(CH_2CHOCH(CH_2)_2)CH(CH_2)_4Si(OC_2H_5)_3$
(12) $(CH_2CHOCH(CH_2)_2)CH(CH_2)_6Si(OC_2H_5)_3$

The $(CH_2OCH)CH_2O$— group is a functional group represented by Chemical formula 2 (glycidyloxy group), and the $(CH_2CHOCH(CH_2)_2)CH$— group is a functional group represented by Chemical formula 3 (3,4-epoxycyclohexyl group).

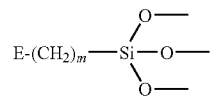

[Chemical formula 2]

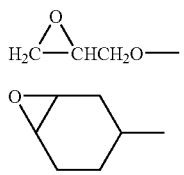

[Chemical formula 3]

The epoxidized cadmium sulfide fine particles 11 are produced by dispersing the cadmium sulfide fine particles 21 in a reaction solution that contains an alkoxysilane compound having an epoxy group, a condensation catalyst that accelerates a condensation reaction between an alkoxysilyl group and a hydroxyl group 22 of a surface of the cadmium sulfide fine particles 21 (see FIG. 2(A)), and a nonaqueous organic solvent and carrying reacting at room temperature in the air.

Examples of the condensation catalyst include metal salts, such as carboxylic acid metal salts, carboxylate ester metal salts, carboxylic acid metal salt polymers, carboxylic acid metal salt chelates, titanate esters, and titanate ester chelates.

The additive amount of the condensation catalyst ranges from 0.2% to 5% by mass or 0.5% to 1% by mass of the alkoxysilane compound.

Specific examples of carboxylic acid metal salts include tin(II) acetate, dibutyltin dilaurate, dibutyltin dioctate, dibutyltin diacetate, dioctyltin dilaurate, dioctyltin dioctate, dioctyltin diacetate, tin(II) dioctanoate, lead naphthenate, cobalt naphthenate, and 2-ethylhexanoic acid iron salt.

Specific examples of carboxylate ester metal salts include a dioctyltin bis(octylthioglycolic acid ester) salt and a dioctyltin maleate salt.

Specific examples of carboxylic acid metal salt polymers include a dibutyltin maleate polymer and a dimethyltin mercaptopropionate polymer.

Specific examples of carboxylic acid metal salt chelates include dibutyltin bis(acetylacetate) and dioctyltin bis(acetyllaurate).

Specific examples of titanate esters include tetrabutyl titanate and tetranonyl titanate.

Specific examples of titanate ester chelates include bis(acetylacetonyl)dipropyl titanate.

The condensation reaction occurs between an alkoxysilyl group and a hydroxyl group 22 of a surface of the cadmium sulfide fine particles 21, yielding the monomolecular film 23 of the film compound having an epoxy group having the structure represented by Chemical formula 4. Three single bonds of oxygen atoms are bound to a silicon (Si) atom of a surface of the cadmium sulfide fine particles 21 or an adjacent silane compound. At least one of the three single bonds is bound to a silicon atom of a surface of the cadmium sulfide fine particles 21.

[Chemical formula 4]

$$E\text{-}(CH_2)_m\text{---}Si\begin{array}{c}\diagup O\text{---}\\ \text{---}O\text{---}\\ \diagdown O\text{---}\end{array}$$

Since an alkoxysilyl group decomposes in the presence of water, the reaction is performed in the air at a relative humidity of 45% or less. The condensation reaction is inhibited by oil and fat or water on a surface of the cadmium sulfide fine particles 21. Thus, the cadmium sulfide fine particles 21 can be previously washed and dried to remove these impurities.

In the presence of any of the metal salt condensation catalysts described above, the condensation reaction time is about two hours.

When, in place of the above-mentioned metal salt, at least one compound selected from the group consisting of ketimine compounds, organic acids, aldimine compounds, enamine compounds, oxazolidine compounds, and aminoalkylalkoxysilane compounds is used as a condensation catalyst, the reaction time can be reduced to half to two thirds.

Using these compounds as promoters, together with the metal salt described above (at a mass ratio in the range of 1:9 to 9:1, or about 1:1), the reaction time can be further reduced.

For example, using a ketimine compound H3 from Japan Epoxy Resins Co., Ltd. in place of a carboxylic acid metal salt chelate dibutyltin bis(acetylacetonate) as a condensation catalyst under the same conditions in manufacturing epoxidized cadmium sulfide fine particles 11, the reaction time can be reduced to about one hour without compromising the quality of the epoxidized cadmium sulfide fine particles 11.

Furthermore, using a mixture (at a mixture ratio of 1:1) of H3 from Japan Epoxy Resins Co., Ltd. and dibutyltin bis(acetylacetonate) as a condensation catalyst under the same conditions in manufacturing epoxidized cadmium sulfide fine particles 11, the reaction time can be reduced to about 20 min.

The ketimine compound used herein may be, but not limited to, 2,5,8-triaza-1,8-nonadiene, 3,11-dimethyl-4,7,10-triaza-3,10-tridecadiene, 2,10-dimethyl-3,6,9-triaza-2,9-undecadiene, 2,4,12,14-tetramethyl-5,8,11-triaza-4,11-pentadecadiene, 2,4,15,17-tetramethyl-5,8,11,14-tetraaza-4,14-octadecadiene, or 2,4,20,22-tetramethyl-5,12,19-triaza-4,19-trieicosadiene.

The organic acid used herein may be, but not limited to, formic acid, acetic acid, propionic acid, butyric acid, or malonic acid.

The reaction solution may be manufactured using an organochlorine solvent, a hydrocarbon solvent, a fluorocarbon solvent, a silicone solvent, and a mixed solvent thereof. The solvent is dried with a drying agent or by distillation to prevent hydrolysis of an alkoxysilane compound. The solvent has a boiling point in the range of from 50° C. to 250° C.

Specific examples of the solvent include nonaqueous petroleum naphtha, solvent naphtha, petroleum ether, petroleum benzine, isoparaffin, normal paraffin, decalin, industrial gasoline, nonane, decane, heating oil, dimethyl silicone, phenyl silicone, alkyl-modified silicone, polyether silicone, and dimethylformamide.

Additional examples of the solvent include alcohol solvents, such as methanol, ethanol, and propanol, and mixtures thereof.

Examples of the fluorocarbon solvent include chlorofluorocarbon solvents, Fluorinert (from 3M Co., USA) and Afluid (from Asahi Glass Co., Ltd.). These fluorocarbon solvents may be used alone or in combination of two or more if they are miscible with each other. Furthermore, an organochlorine solvent, such as dichloromethane or chloroform, may be added.

The concentration of the alkoxysilane compound in the reaction solution ranges from 0.5% to 3% by mass.

After the reaction, the unreacted alkoxysilane compound and the unreacted condensation catalyst are removed by washing with a solvent, thus producing the epoxidized cadmium sulfide fine particles 11 coated with the monomolecular film 23 of a film compound having an epoxy group. FIG. 2(B) is a schematic view of the cross-sectional structure of an epoxidized cadmium sulfide fine particle 11 thus produced.

The washing solvent may be any solvent that can dissolve the alkoxysilane compound. The washing solvent is dichloromethane, chloroform, or N-methylpyrrolidone because these solvents are inexpensive, can dissolve the alkoxysilane well, and are easy to remove by air drying.

If the epoxidized cadmium sulfide fine particles 11 are not washed with a solvent and left in the air after the reaction, part of the alkoxysilane compounds remaining on the surface of the epoxidized cadmium sulfide fine particles 11 are hydrolyzed by water in the air, and the resulting silanol group causes a condensation reaction with the alkoxysilyl group. This results in the formation of an ultrathin polysiloxane polymer film on a surface of the epoxidized cadmium sulfide fine particles 11. Although this polymer film is not necessarily entirely fixed on the surface of the epoxidized cadmium sulfide fine particles 11 by a covalent bond, the polymer film has an epoxy group and therefore has the same reactivity to the epoxidized cadmium sulfide fine particles 11 as the monomolecular film 23 of a film compound having an epoxy group. Thus, even if the epoxidized cadmium sulfide fine particles 11 are not washed with a solvent, there is no particular problem in the manufacturing process after the step C.

While an alkoxysilane compound having an epoxy group is used as a film compound, a straight-chain alkylene group having an amino group at one end and an alkoxysilyl group at the other end, that is, an alkoxysilane compound represented by the following general formula (Chemical formula 5) may be used.

[Chemical formula 5]

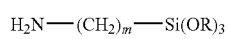

In Chemical formula 5, m can be an integer of 3 to 20, and R can be an alkyl group having 1 to 4 carbon atoms.

Specific examples of the film compound having an amino group include the following alkoxysilane compounds (21) to (28).

(21) $H_2N(CH_2)_3Si(OCH_3)_3$
(22) $H_2N(CH_2)_5Si(OCH_3)_3$
(23) $H_2N(CH_2)_7Si(OCH_3)_3$
(24) $H_2N(CH_2)_9Si(OCH_3)_3$
(25) $H_2N(CH_2)_5Si(OC_2H_5)_3$
(26) $H_2N(CH_2)_5Si(OC_2H_5)_3$
(27) $H_2N(CH_2)_7Si(OC_2H_5)_3$
(28) $H_2N(CH_2)_9Si(OC_2H_5)_3$

Among the condensation catalysts used in the reaction solution, compounds containing a tin (Sn) salt react with an amino group and form a precipitate. Thus, these compounds cannot be used as condensation catalysts for alkoxysilane compounds having an amino group.

When an alkoxysilane compound having an amino group is used, therefore, the same compounds as in the case of the alkoxysilane compounds having an epoxy group other than carboxylic acid tin salts, carboxylate tin salts, carboxylic acid tin salt polymers, and carboxylic acid tin salt chelates can be used alone or in combination as condensation catalysts.

The type of promoter, the combination of promoters, the type of solvent, the concentrations of the alkoxysilane compound, the condensation catalyst, and the promoter, the reaction conditions, and the reaction time are the same as in the case using alkoxysilane compounds having an epoxy group and will not be further described.

While the cadmium sulfide fine particles are used as fluorescent fine particles, other fluorescent fine particles may be used. Examples of the fluorescent fine particles include fluorescent substances for plasma displays in which an impurity, such as a rare earth or manganese, is added to a base material, such as an oxide, a phosphorylated compound, or a halide; fluorescent substances for CRTs, such as ZnS:Ag, Cl, ZnS: Cu, Au, Al, and $Y_2O_2S$:Eu; fluorescent substances for radioluminescence, such as NaI and ZnS; and fluorescent substances for electroluminescence (EL) in which copper halide, Mn, or a rare earth is added as an active ingredient to a base material, such as ZnS, ZnCdS, CaS, or ZnSe.

When fluorescent fine particles other than the cadmium sulfide fine particles have an active hydrogen group, such as a hydroxyl group or an amino group, on the surface thereof, an alkoxysilane compound can also be used as a film compound, as in the case of the cadmium sulfide fine particles. For a fluorescent sulfide substance, an alkyl phosphine compound that can coordinate to a sulfur atom via a P—S bond may be used.

In the step B, epoxidized cadmium sulfide fine particles 11, 2-methylimidazole 12, and a solvent are blended to produce cadmium sulfide paste.

2-methylimidazole 12 has an amino group at position 1 and an imino group at position 3. These groups undergo crosslinking reactions with epoxy groups to form bonds, as shown by the following Chemical formula 6.

[Chemical formula 6]

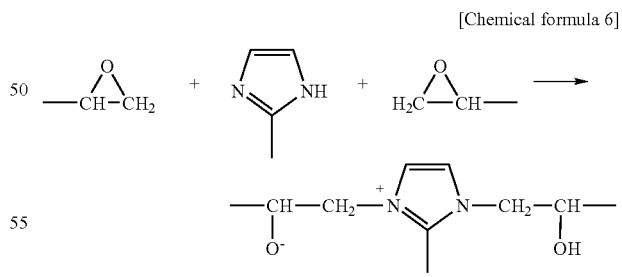

The additive amount of 2-methylimidazole 12 ranges from 5% to 15% by weight of the epoxidized cadmium sulfide fine particles 11. When the additive amount of 2-methylimidazole 12 is less than 5% by weight of the epoxidized cadmium sulfide fine particles 11, the resulting cadmium sulfide cured film 10 has a low strength. When the amount of 2-methylimidazole 12 is more than 15% by weight of the epoxidized cadmium sulfide fine particles 11, the handleability of the cadmium sulfide paste is reduced, for example, the paste easily turns into gel. In manufacturing cadmium sulfide paste, any solvent that dissolves 2-methylimidazole 12 can be used. Lower alcohol solvents, such as isopropyl alcohol and ethanol, are favorable in terms of cost, volatility at room temperature, and toxicity.

The amount of solvent used in manufacturing cadmium sulfide paste depends on the particle diameter of epoxidized cadmium sulfide fine particles 11, the thickness of the cadmium sulfide cured film 10, and other factors. However, the amount of solvent is such that the viscosity of the resulting cadmium sulfide paste ranges from 5 to 300 Pa·s. More specifically, the amount of solvent ranges from 10% to 50% by weight of the epoxidized cadmium sulfide fine particles 11 and 2-methylimidazole 12. Specifically, the amount of the solvent is set at an amount required to coat the surfaces of the epoxidized cadmium sulfide fine particles 11 with monomolecular films of 2-methylimidazole 12.

The epoxidized cadmium sulfide fine particles 11, 2-methylimidazole 12, and the solvent may be blended by any means, such as agitation blades or a hand mixer.

While 2-methylimidazole is used as a curing agent in the present embodiment, an imidazole derivative represented by the following Chemical formula 7 may be used.

In addition to the imidazole derivatives, heterocyclic compounds containing at least two nitrogens, such as melamine, isocyanuric acid, triazine, barbituric acid, parabanic acid, uracil, and thymine, may be used. Imidazole-metal complexes may also be used.

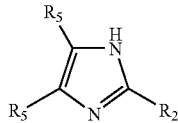

[Chemical formula 7]

Specific examples of the imidazole derivative represented by Chemical formula 7 include the following imidazole derivatives (31) to (38).

(31) 2-methylimidazole ($R_2$=Me, $R_4$=$R_5$=H)
(32) 2-undecylimidazole ($R_2$=$C_{11}H_{23}$, $R_4$=$R_5$=H)
(33) 2-pentadecylimidazole ($R_2$=$C_{15}H_{31}$, $R_4$=$R_5$=H)
(34) 2-methyl-4-ethylimidazole ($R_2$=Me, $R_4$=Et, $R_5$=H)
(35) 2-phenylimidazole ($R_2$=Ph, $R_4$=$R_5$=H)
(36) 2-phenyl-4-ethylimidazole ($R_2$=Ph, $R_4$=Et, $R_5$=H)
(37) 2-phenyl-4-methyl-5-(hydroxymethyl)imidazole ($R_2$=Ph, $R_4$=Me, $R_5$=$CH_2OH$)
(38) 2-phenyl-4,5-bis(hydroxymethyl)imidazole ($R_2$=Ph, $R_4$=$R_5$=$CH_2OH$)

Me, Et, and Ph can be a methyl group, an ethyl group, and a phenyl group, respectively.

A compound used as a curing agent for an epoxy resin, for example, an acid anhydride, such as phthalic anhydride or maleic anhydride, dicyandiamide, and a phenol derivative, such as novolak, may also be used as a curing agent. In this case, an imidazole derivative may be used as a catalyst to accelerate the crosslinking reaction.

While the film compound has an epoxy group as a reactive group in the present embodiment, when the film compound has an amino or imino group as a reactive group, a curing agent having two or more epoxy or isocyanate groups as crosslinking reaction groups is used. Specific examples of the compound having isocyanate groups include hexamethylene-1,6-diisocyanate, toluene-2,6-diisocyanate, and toluene-2,4-diisocyanate.

The additive amount of these isocyanate groups ranges from 5% to 15% by weight of epoxidized cadmium sulfide fine particles, as in the case of 2-methylimidazole. In this case, the solvent used in manufacturing cadmium sulfide paste may be an aromatic solvent, such as xylene.

Furthermore, compounds having two or more epoxy groups, such as ethylene glycol diglycidyl ether, may also be used as curing agents.

When a film compound having an epoxy group as a reactive group is used, the cadmium sulfide paste may further contain a cationic photopolymerization initiator as a photo-curing agent. Since epoxy groups are cationically polymerizable, a coating of the cadmium sulfide paste can be cured by cationic polymerization of epoxy groups induced by photoirradiation.

Examples of the photopolymerization initiator include cationic photopolymerization initiators, such as diaryliodonium salts. Examples of the light source include a high-pressure mercury lamp and a xenon lamp.

In step C, a second film compound having an epoxy group, which is the same film compound used in the step A, is brought into contact with a glass substrate 31 to produce an epoxidized glass substrate 13 coated with a monomolecular film 33 of the second film compound having an epoxy group.

The glass substrate 31 may have any size, shape, and thickness.

The epoxidized glass substrate 13 is produced by applying a reaction solution that contains an alkoxysilane compound having an epoxy group and an alkoxysilyl group (an example of a second surface bonding group), a condensation catalyst that accelerates a condensation reaction between the alkoxysilyl group and a hydroxyl group of a surface of the glass substrate 31, and a nonaqueous organic solvent on the surface of the glass substrate 31, and carrying out reaction at room temperature in the air. The reaction solution can be applied by any method, including a doctor blade method, a dip coating method, a spin coating method, a spray method, a screen printing method, and an ink-jet printing method.

The type of alkoxysilane compound having an epoxy group, the type of condensation catalyst promoter, the combination of promoters, the type of solvent, the concentrations of the alkoxysilane compound, the condensation catalyst, and the promoter, the reaction conditions, and the reaction time in step C are the same as in the step A and will not be further described.

After the reaction, the glass substrate 31 is washed with a solvent to remove the unreacted alkoxysilane compound and the condensation catalyst, thus producing an epoxidized glass substrate 13 coated with the monomolecular film 33 of the second film compound having an epoxy group.

The washing solvent may be the same as in step A.

If the epoxidized glass substrate 13 is not washed with a solvent and is left in the air after the reaction, part of the alkoxysilane compound remaining on the epoxidized glass substrate 13 is hydrolyzed by water in the air, and the resulting silanol group causes a condensation reaction with the alkoxysilyl group. This results in the formation of an ultrathin polysiloxane polymer film on the epoxidized glass substrate 13. Although this polymer film is not fixed on the epoxidized glass substrate 13 by a covalent bond, the polymer film has an epoxy group and therefore has the same reactivity to the epoxidized glass substrate 13 as the monomolecular film 33 of a film compound having an epoxy group. Thus, even if the epoxidized glass substrate 13 is not washed with a solvent, there is no particular problem in the manufacturing process after step C.

[

While an alkoxysilane compound having an epoxy group is used, an alkoxysilane compound in which a straight-chain alkylene group has an amino group at one end and an alkoxysilyl group at the other end may be used, as in step A.

Furthermore, while the same alkoxysilane compound as in the step A is used in the present embodiment, a different alkoxysilane compound may be used, provided that the alkoxysilane compound has a reactive group that reacts with a crosslinking reaction group of the curing agent used in step C to form a bond.

While glass is used as the substrate material in the present embodiment, metals, such as aluminum, and synthetic resins, such as polycarbonate, may also be used.

When the substrate material has an active hydrogen group, such as a hydroxyl group or an amino group, on the surface thereof, an alkoxysilane compound can also be used as a second film compound, as in the case of the glass substrate. Specific examples of such a substrate include metals, such as aluminum, and ceramics.

When a synthetic resin is used as the substrate material, an alkoxysilane compound can be used by grafting a compound having an active hydrogen group by plasma processing.

In step D, cadmium sulfide paste is applied on the epoxidized glass substrate 13 to form a coating 14, as illustrated in FIG. 3.

The cadmium sulfide paste may be applied by any method, including a doctor blade method, a spin coating method, and a spray method.

The thickness of the coating 14 can be appropriately controlled by the viscosity of the cadmium sulfide paste, the solvent content, the particle diameter of the cadmium sulfide fine particles that is used as a raw material, and the number of applications.

In step E, the coating 14 is heated to cure the coating 14 by a crosslinking reaction between epoxy groups on the epoxidized cadmium sulfide fine particles 11 and the epoxidized glass substrate 13 and 2-methylimidazole 12, thus producing a cadmium sulfide cured film 10.

The heating temperature ranges from 50° C. to 200° C. At a heating temperature below 50° C., the crosslinking reaction takes a long period of time. At a heating temperature above 200° C., the crosslinking reaction proceeds rapidly on the surface of the coating 14, and the solvent that is trapped under the surface of the coating 14 can not volatize. Thus, a cadmium sulfide cured film 10 having a uniform magnetic recording layer cannot be obtained.

While the epoxidized glass substrate is used in the present embodiment, a common glass substrate may be used as the substrate without performing the step C.

In step E, a bond formed by the crosslinking reaction may be a covalent bond, an ionic bond, a coordinate bond, or a bond due to intermolecular force. The bond is a covalent bond formed by heating or energy beam irradiation, such as photoirradiation, after the formation of the coating 14, in view of the strength of the cadmium sulfide cured film 10 and ease of formation of the cadmium sulfide paste and the coating 14.

Specific examples of a covalent bond formed by heating include an N—$CH_2CH(OH)$ bond formed by a reaction between an epoxy group and an amino or imino group (see Chemical formula 8) and an NH—CONH bond formed by a reaction between an isocyanate group and an amino group (see Chemical formula 9).

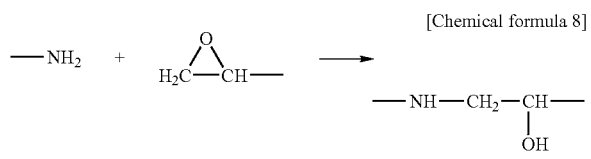

[Chemical formula 8]

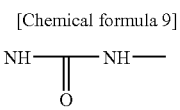

[Chemical formula 9]

Specific examples of a covalent bond formed by photoirradiation include a covalent bond formed by photodimerization of cinnamoyl groups (Chemical formula 10) or chalconyl groups (Chemical formula 11).

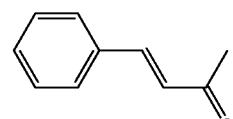

[Chemical formula 10]

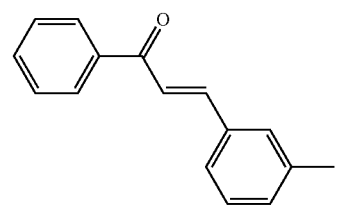

[Chemical formula 11]

If the cadmium sulfide paste contains a cationic photoinitiator as a photo-curing agent, when the coating 14 is irradiated with (exposed to) light through a photomask that is selectively transparent to light only in a patterned portion, cationic polymerization of epoxy groups proceeds selectively only in the irradiated pattern portion. Thus, only the exposed portion can be selectively cured. Washing, for example, with a solvent removes cadmium sulfide paste only in an uncured portion of the coating 14, thus producing a film partially cured in a pattern. Additional heat treatment allows unreacted epoxy groups and 2-methylimidazole 12 to react, thus producing a fluorescent film formed in a pattern.

The exposure mask may be formed of any material that blocks light and that is resistant to light at least during exposure, for example, a material for a reticle for photolithography in the manufacture of semiconductor elements. The exposure may be a projection exposure at the same magnification, or may be a projection exposure at a reduced magnification for fine patterning.

EXAMPLES

Examples that were performed to confirm the effects of the paste and film. However, the paste and film are not limited to these examples. In the present examples, the manufacture of a cadmium sulfide film using cadmium sulfide fine particles is described as a representative example.

Example 1

(1) Production of Epoxidized Cadmium Sulfide Fine Particles

Cadmium sulfide fine particles were washed completely and dried.

0.99 parts by weight of 3-glycidyloxypropyltrimethoxysilane (Chemical formula 12, manufactured by Shin-Etsu Chemical Co., Ltd.) and 0.01 parts by weight of dibutyltin bis(acetylacetonate) (condensation catalyst) were weighed and dissolved in 100 parts by weight of hexamethyldisiloxane-dimethylformamide mixed solvent (1:1 v/v) to prepare a reaction solution.

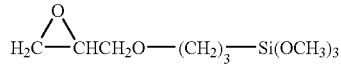

[Chemical formula 12]

The cadmium sulfide fine particles were mixed in the reaction solution thus obtained and was allowed to react in the air (at a relative humidity of 45%) for about two hours with stirring.

The cadmium sulfide fine particles were then washed with chloroform to remove the unreacted alkoxysilane compound and dibutyltin bis(acetylacetonate), thus producing epoxidized cadmium sulfide fine particles coated with a monomolecular film of a 3-glycidyloxypropylsilane compound having a thickness of about 1 nm.

(2) Production of Cadmium Sulfide Paste 40 parts by weight of isopropyl alcohol was added to a mixture of 100 parts by weight of epoxidized cadmium sulfide fine particles produced in (1) and 7 parts by weight of 2-methylimidazole. The resulting mixture was completely mixed to produce cadmium sulfide paste.

(3) Production of Epoxidized Glass Substrate

A glass substrate was completely washed and dried.

0.99 parts by weight of 3-glycidyloxypropyltrimethoxysilane (Chemical formula 12) and 0.01 parts by weight of dibutyltin bisacetylacetonate (condensation catalyst) were dissolved in 100 parts by weight of hexamethyldisiloxane-dimethylformamide mixed solvent (1:1 v/v) to prepare a reaction solution.

The reaction solution was applied on the glass substrate and was allowed to react in the air (at a relative humidity of 45%) for about two hours.

The glass substrate was then washed with chloroform to remove the unreacted alkoxysilane compound and dibutyltin bisacetylacetonate.

(4) Formation of Coating and Formation of Cadmium Sulfide Cured Film

The cadmium sulfide paste produced in (2) was applied on the epoxidized glass substrate produced in (3) to form a coating having a thickness of 3 μm.

After isopropyl alcohol was evaporated at room temperature, the glass substrate and the coating formed thereon were heated at 170° C. for 30 minutes to form a cadmium sulfide cured film.

The cadmium sulfide film thus obtained was fixed on the surface of the epoxidized glass substrate via a bond formed by a crosslinking reaction between epoxy groups and 2-methylimidazole, and therefore had a high peel resistance and durability.

Example 2

(1) Production of Aminated Cadmium Sulfide Fine Particles

Cadmium sulfide fine particles (average particle diameter: 100 nm) were washed completely and dried.

0.99 parts by weight of 3-aminopropyltrimethoxysilane (Chemical formula 13, manufactured by Shin-Etsu Chemical Co., Ltd.) and 0.01 parts by weight of acetic acid (condensation catalyst) were weighed and dissolved in 100 parts by weight of hexamethyldisiloxane-dimethylformamide mixed solvent (1:1 v/v) to prepare a reaction solution.

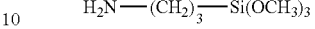

[Chemical formula 13]

The cadmium sulfide fine particles was mixed in the reaction solution thus obtained and was allowed to react in the air (at a relative humidity of 45%) for about two hours with stirring.

The cadmium sulfide fine particles were then washed with chloroform to remove the unreacted alkoxysilane compound and acetic acid.

(2) Production of Cadmium Sulfide Paste, Formation of Coating, and Formation of Cadmium Sulfide Cured Film 40 parts by weight of xylene was added to a mixture of 100 parts by weight of aminated cadmium sulfide fine particles produced in (1) and 9 parts by weight of hexamethylene-1,6-diisocyanate. The resulting mixture was completely mixed to produce cadmium sulfide paste.

(3) Production of Aminated Glass Substrate

A glass substrate was completely washed and dried.

0.99 parts by weight of 3-aminopropyltrimethoxysilane (Chemical formula 13) and 0.01 parts by weight of acetic acid (condensation catalyst) were weighed and dissolved in 100 parts by weight of hexamethyldisiloxane-dimethylformamide mixed solvent (1:1 v/v) to prepare a reaction solution.

The reaction solution was applied on the glass substrate and was allowed to react in the air (at a relative humidity of 45%) for about two hours.

The glass substrate was then washed with chloroform to remove the unreacted alkoxysilane compound and acetic acid.

(4) Production of Cadmium Sulfide Paste, Formation of Coating, and Formation of Cadmium Sulfide Film The cadmium sulfide paste produced in (2) was applied on the aminated glass substrate produced in (3) to form a coating having a thickness of 3 μm.

After xylene was evaporated at room temperature, the aminated glass substrate and the coating were heated at 170° C. for 30 minutes to form a cadmium sulfide cured film.

Example 3

(1) Production of Epoxidized Cadmium Sulfide Fine Particles

Epoxidized cadmium sulfide fine particles were produced by the same method as in (1) in Example 1.

(2) Production of Cadmium Sulfide Paste Containing Photo-Curing Agent 40 parts by weight of isopropyl alcohol was added to a mixture of 100 parts by weight of epoxidized cadmium sulfide fine particles produced in (1), a proper amount of 2-methylimidazole, and a proper amount of Irgacure (registered trademark) 250 (a 3:1 mixture of (4-methylphenyl)[4-(2-methylpropyl)phenyl]iodonium hexafluorophosphate) and propylene carbonate, manufactured by Chiba Specialty Chemicals Co., Ltd.). The resulting mixture was completely mixed to produce cadmium sulfide paste.

(3) Production of Epoxidized Glass Substrate

An epoxidized glass substrate was produced by the same method as in (3) in Example 1.

(4) Formation of Coating and Formation of Cadmium Sulfide Cured Film Formed in a Pattern The cadmium sulfide paste produced in (2) was applied on the epoxidized glass substrate produced in (3) to form a coating having a thickness of 3 μm.

After isopropyl alcohol was evaporated at room temperature, the cadmium sulfide paste was irradiated with 254 nm far-ultraviolet rays through a photomask to cure only the exposed portion. After washing with ethanol, only a cured portion remained. Thus, a film partially cured in a pattern was prepared. The film partially cured in a pattern was further heated at 170° C. for 30 minutes to obtain a cadmium sulfide cured film formed in a pattern.

REFERENCE NUMERALS 10 cadmium sulfide cured film
11 epoxidized cadmium sulfide fine particle
12 2-methylimidazole
13 epoxidized glass substrate
14 coating
21 cadmium sulfide fine particle
22 hydroxyl group
23 monomolecular film of film compound having epoxy group
31 glass substrate
33 monomolecular film of second film compound having an epoxy group

The invention claimed is:

1. A fluorescent paste comprising:
a plurality of fluorescent particles; and
a film coated on each of the plurality of fluorescent particles, said film being formed of film compounds, wherein each film compound has a reactive group at one end of a molecule of each film compound, and wherein each film compound is bound to one of the plurality of fluorescent particles; and
a curing agent having a plurality of crosslinking reaction groups which can react with the reactive groups of the film to bind the plurality of fluorescent particles together, wherein the plurality of cross-linking reaction groups are selected from the group consisting of compounds having two or more epoxy groups, compounds having two or more isocyanate groups, and imidazole compounds.

2. The fluorescent paste of claim 1, wherein each film compound is bound to one of the plurality of fluorescent particles by a silicon group and the reactive group of each film compound is selected from the group consisting of an epoxy group, an amino group, and an imino group.

3. The fluorescent paste of claim 1, comprising a photo-curing agent.

4. The fluorescent paste of claim 1, wherein the film compounds from two or more of the plurality of fluorescent particles are configured to react with the curing agent such that the two or more of the plurality of fluorescent particles can be linked directly together.

5. The fluorescent paste of claim 1, wherein the plurality of fluorescent particles comprise cadmium sulfide particles.

6. The fluorescent paste of claim 1, wherein the curing agent comprises an imidazole.

7. The fluorescent paste of claim 6, wherein the curing agent comprises 2-methylimidazole.

8. The fluorescent paste of claim 6, wherein the reactive group of each film coated on each of the plurality of fluorescent particles comprises an epoxy group.

9. The fluorescent paste of claim 1, wherein each film coated on each of the plurality of fluorescent particles is a monomolecular film.

10. A fluorescent paste comprising:
a plurality of fluorescent particles; and
a monomolecular film coated on each of the plurality of fluorescent particles, wherein said monomolecular film is formed of film compounds, wherein each film compound has an epoxy reactive group at one end of a molecule of each film compound, and wherein each film compound is bound to one of the plurality of fluorescent particles; and
a curing agent comprising an imidizole which can react with the epoxy reactive groups of the film compounds to bind the plurality of fluorescent particles together.

11. The fluorescent paste of claim 10, wherein the curing agent comprises 2-methylimidazole.

12. The fluorescent paste of claim 10, wherein the plurality of fluorescent particles comprise cadmium sulfide particles.

* * * * *

UNITED STATES PATENT AND TRADEMARK OFFICE
CERTIFICATE OF CORRECTION

PATENT NO. : 8,715,530 B2  
APPLICATION NO. : 12/663060  
DATED : May 6, 2014  
INVENTOR(S) : Ogawa Page 1 of 1

It is certified that error appears in the above-identified patent and that said Letters Patent is hereby corrected as shown below:

On the title page, item (57), under "ABSTRACT", in Column 2, Line 3, delete "resistance Fluorescent" and insert -- resistance. Fluorescent --, therefor.

In the Specification

In Column 2, Line 9, delete "preformed" and insert -- performed --, therefor.

In Column 3, Line 32, delete "DESCRIPTION" and insert -- BRIEF DESCRIPTION --, therefor.

In Column 5, Line 7, delete "[".

In Column 7, Line 59, delete "bis(acetylacetate)" and insert -- bis(acetylacetonate) --, therefor.

In Column 12, Line 63, delete "[".

In the Claims

In Column 18, Line 44, in Claim 10, delete "groups" and insert -- group --, therefor.

Signed and Sealed this  
Ninth Day of September, 2014

Michelle K. Lee  
*Deputy Director of the United States Patent and Trademark Office*